Figure 1:
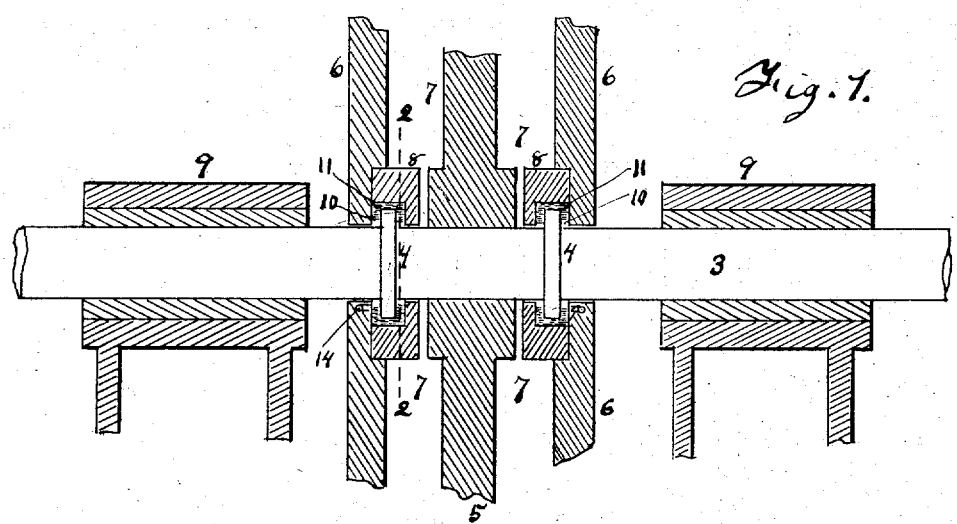

No. 773,297. PATENTED OCT. 25, 1904.
L. H. NASH.
LIQUID STUFFING BOX FOR STEAM TURBINES.
APPLICATION FILED MAR. 11, 1904.
NO MODEL. 2 SHEETS—SHEET 1.

WITNESSES:
Anna M. Nash
Mildred A. Nash

INVENTOR
Lewis Hallock Nash

No. 773,297. PATENTED OCT. 25, 1904.
L. H. NASH.
LIQUID STUFFING BOX FOR STEAM TURBINES.
APPLICATION FILED MAR. 11, 1904.
NO MODEL. 2 SHEETS—SHEET 2.
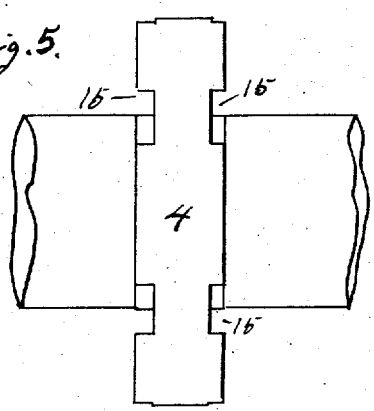
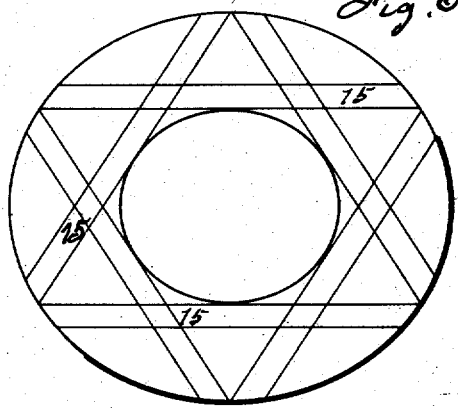
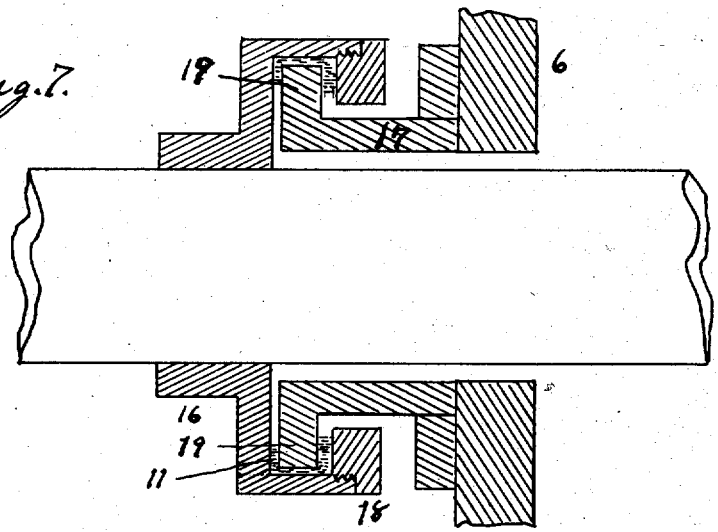
Witnesses:
A. B. Ahrens
J. Greer
Inventor
Lewis Hallock Nash No. 773,297. Patented October 25, 1904.

UNITED STATES PATENT OFFICE.

LEWIS HALLOCK NASH, OF SOUTH NORWALK, CONNECTICUT.

LIQUID STUFFING-BOX FOR STEAM-TURBINES.

SPECIFICATION forming part of Letters Patent No. 773,297, dated October 25, 1904.

Application filed March 11, 1904. Serial No. 197,624. (No model.)

*To all whom it may concern:*

Be it known that I, LEWIS HALLOCK NASH, a citizen of the United States, and a resident of South Norwalk, in the county of Fairfield and State of Connecticut, have invented a new and useful Improvement in Liquid Stuffing-Boxes for Steam-Turbines, &c., of which the following is a specification.

My invention is directed to a device for securing an air-tight joint upon a rotating shaft as it passes out of a chamber—as, for instance, the cylinder of a steam-turbine. It is therefore a form of stuffing-box. For this purpose I make use of a rotating liquid, as mercury, under rapid rotation to form the seal in an effective and novel manner, as I will presently describe.

Among the advantages of my improved liquid stuffing-box may be mentioned the following: There is absolutely no leakage possible by the joint. The friction of the stuffing-box is so small as to be negligible. The bearing is self-adjusting and can run out of line without serious injury and without leakage, and, what is of great value in a steam-turbine, there can no oil pass into the engine from without nor steam or water pass out, and a perfect vacuum can be maintained. The main bearings of the engine can therefore be placed outside of the steam-chamber, where they can be taken care of and inspected, and the alinement of the stuffing-box will adjust itself. Thus the trouble of oil entering the steam-chamber of the turbine will be entirely overcome, and the water from the condenser will contain no oil, but can be used directly in the boiler.

I have shown in the drawings my invention as applied to the shaft of a steam-turbine; but it will be understood that I do not confine my invention to such use, as many other forms of devices can make use of my improved stuffing-box, nor do I limit my invention to the exact form shown, since various changes may be made in its form and construction without departing from the spirit and scope of my invention.

The special features of novelty which constitute my improvement will be carefully pointed out in the claims concluding this specification.

Figure 2:
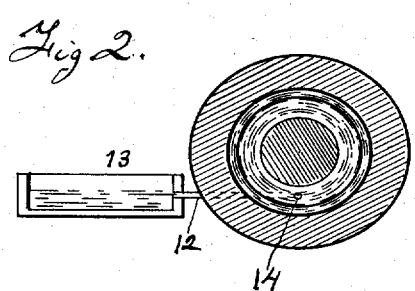
Figure 3:
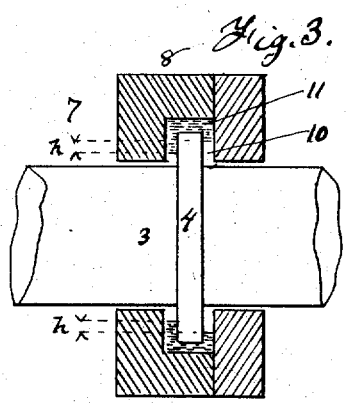
Figure 4:
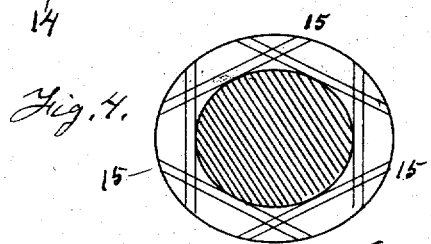

Referring to the drawings, Figure 1 is a longitudinal section through a steam-turbine, showing one method of arranging the stuffing-box and the shaft-bearings. Fig. 2 is a cross-section on the line 2 2 of Fig. 1 and also shows a method of introducing the liquid joint-forming material. Fig. 3 is an enlarged detail of the stuffing-box to illustrate the action of centrifugal force in maintaining the joint. Fig. 4 is an enlarged view of the collar, showing means for producing an increased rotation of the liquid. Fig. 5 is an enlarged view of the shaft and collar, showing the grooves and intervening projections. Fig. 6 is an end view of the same. Fig. 7 is a section of a modified form of stuffing-box in which the receptacle for holding the revolving fluid is carried by the shaft.

In Fig. 1 I have shown a section through the bearings and case of a steam-turbine at the shaft, the case and power-wheel being shown in broken section, since my invention only relates to the parts shown in relation to the shaft and its bearings. 3 is the shaft, which is provided with collars 4 4, preferably formed solid with the shaft. 5 is the turbine-wheel, which is inclosed between the case-walls 6 6, which form the closure for the chamber 7. The shaft 3 passes through holes in these case-walls 6 6, and a flanged cylinder 8 8 is secured to each side of the case, so as to cover the collars 4 4 and form a circular chamber 10, in which the collars can freely revolve. The shaft-bearings 9 9 are placed outside of the case-chamber on each side of the same. The chambers 10 10 are filled with mercury 11 11 or some other suitable liquid, which may be introduced through a pipe 12 from a reservoir 13, as shown in Figs. 1 and 2. This pipe 12 enters the chamber 10 through an orifice 14 at the point where it is desired to maintain the level of the liquid 11, and the liquid in the communicating vessel 13 is maintained at the same level, so that in the operation of the device the liquid will flow in or out of this reservoir to maintain this condition.

In Fig. 3 I have shown an enlarged view of the stuffing-box in order to illustrate the action of the device.

Suppose the shaft 3 to be revolving at a high speed and that the revolving liquid assumes an annular position, as shown in section in Fig. 3. Then if there were no difference in the pressures on the opposite sides of the collar 4 the level of the liquid on the two sides would be the same; but if there were a vacuum on the side 7 and a pressure on the opposite side this difference in pressure would force the liquid outward on the side where the pressure is greatest and inward where the pressure is least and would produce a difference of level $h$ on the two sides of the collar, as illustrated in the drawing. The action of the centrifugal force will resist this tendency, and the distance or head $h$ will represent the centrifugal force required to balance the difference in pressure on the opposite sides of the collar 4.

When the speed of rotation of the shaft is very high, as in steam-turbines, a smooth collar 4 will have enough friction to cause the liquid to rotate with sufficient velocity to produce the necessary centrifugal force; but with slower-running shafting it may be desirable to have the liquid rotate as fast as the shaft, and in this case I form grooves or paddles on the collar to increase the rotation of the fluid. In Figs. 4, 5, and 6 I have shown one way to accomplish this result, and this is done by forming surface grooves 15 15 in each side of the collar 4, which will increase the friction of the collar in the liquid, as will be readily understood; but I do not confine my invention to any particular construction of grooves or paddles, as many variations in form are possible to secure the desired result.

In Figs. 4 and 5 the grooves are used to form an irregular surface on the collar, and the intervening projecting surfaces act as paddles to impel the liquid and cause it to rotate rapidly in the groove or recess of the case.

The operation of the device is as follows: Suppose the shaft to be running at a speed of thirty thousand revolutions per minute, or five hundred revolutions per second, and that the mercury rotates at one-half the speed of the shaft, or at the rate of two hundred and fifty revolutions per second, then by the formula for centrifugal force $F = rwn^2 \times 1.2276$, in which $w$ is the weight of the body, $r$ is the radius in feet, and $n$ is the revolutions per second. If $r$ is one inch, $f$ equals $6,250 w$.—that is to say, with a flange or collar dipping into the mercury at a distance of one inch from the center of the shaft the centrifugal force would be six thousand two hundred and fifty times as great as the force of gravity, and a vacuum of thirty inches of mercury would produce a difference of level $h$ of thirty six-thousand-two-hundred-and-fiftieths, or one two-hundred-and-eighths of an inch. The result of this surprising fact will be understood on reflection. The liquid under the action of this strong centrifugal force becomes almost rigid against distortion of its shape, and it will resist any such action as if it was an elastic solid. While it is still a liquid and will move like one, it will hold its place against any lesser force than that which acts to keep it in place, and under the conditions assumed a vacuum would hardly move it at all and a perfect contact will be maintained between the shaft and the case-chamber. If the collar should dip one-eighth of an inch into the mercury, the pressure on the face of the collar would equal seven hundred and eighty inches of mercury; but as this is balanced on all sides of the shaft it runs in a cushion of mercury.

It will be understood that I may use other liquids besides mercury as the joint-forming fluid; but for steam-turbines I prefer to use mercury, because if the case-recess should fill up on one side with oil or on the other side with water the gravity of the mercury will still hold the joint and the oil or water will simply float upon the surface of the mercury, but it will not be able to pass the collar.

In the case of slower-running shafting it may be desirable to increase the rotation of the liquid to that of the shaft in order to secure the greatest centrifugal force. For this purpose I form the collar with grooves or projections, so as to drive the liquid around in the recess at the highest possible speed. This feature is illustrated in Fig. 4 and has already been described. It will be seen that the collar is in reality a diaphragm which is joined at one side to the shaft and on the other side it makes joint with the revolving liquid, and in this way it forms a complete separation between the two sides.

In Figs. 1 and 3 of the drawings I have shown the mercury as carried in a chamber in the case; but it is obvious that the shaft may carry a cup containing the mercury and that the diaphragm may be secured to the case.

In the modification shown in Fig. 7 a circular flange 16 is secured to the shaft so as to form an air-tight fit upon it. This flange has a cylindrical extension, to which a flange 18 is secured, so as to form an annular recess to contain the rotating liquid. An extending cylinder 17 is secured to the case 6 and at its inner end it carries a collar 19, which dips into the liquid 11. It will thus be seen that the recess which carries the joint-forming liquid revolves with the shaft and that therefore the said liquid will rotate at about the speed of the shaft. The joint-forming action of the liquid is, however, not different from that shown in the figures before described.

I claim—

1. A stuffing-box comprising an annular chamber containing a liquid and a disk, the periphery of which extends into said chamber, one of said parts being adapted to be maintained in rapid revolution, whereby the liquid is caused to rotate in said chamber to form a joint between the disk and the chamber.

2. A stuffing-box comprising an annular chamber containing a liquid and a disk, the periphery of which extends into said chamber, one of said parts being provided with projections and adapted to be maintained in rapid revolution, whereby the liquid is caused to rotate in said chamber to form a joint between the disk and the chamber.

3. A stuffing-box comprising an annular chamber containing a liquid and a disk, the periphery of which extends into said chamber, one of said parts being adapted to be maintained in rapid revolution, whereby the liquid is caused to rotate in said chamber to form a joint between the disk and the chamber, and a reservoir of liquid connected with said chamber.

4. The combination of a shaft having a projecting collar, with a closure surrounding said collar and means for causing a liquid to rotate in said closure and form a seal by its centrifugal force, between the shaft and the closure-walls, for the purpose specified.

5. A stuffing-box, comprising a fixed part and a part combined with a rotating fluid rotated by said rotating part intervening and forming a joint between said parts.

6. The combination in a liquid stuffing-box, of a shaft having a collar with a closure surrounding said collar and a pipe having an opening in said closure at the level of the surface of the liquid in said closure, and means for supplying the pipe with liquid for the purpose specified.

7. A shaft-packing comprising a casing provided with an annular chamber for receiving a liquid surrounding said shaft, a collar secured to said shaft and extending within said chamber whereby the liquid is caused to rotate in said chamber.

8. The combination in a liquid stuffing-box of a shaft having a collar and a case having an annular recess adapted to retain a liquid under rotation surrounding said collar, with means for causing the liquid to rotate.

9. In a liquid stuffing-box, the combination of the shaft and its collar, with a case-recess inclosing said collar adapted to contain a liquid under high rotation, and projections on said collar for causing said liquid to rotate.

10. A stuffing-box comprising a fixed part and a part combined with a rotating body of mercury rotated by said rotating part intervening and forming a joint between said parts.

In testimony that I claim the foregoing as my invention I have signed my name, in presence of two witnesses, this 9th day of March, 1904.

LEWIS HALLOCK NASH.

Witnesses:
CHAS. A. HAVILAND,
E. W. HAVILAND.

---

It is hereby certified that in Letters Patent No. 773,297, granted October 25, 1904, upon the application of Lewis Hallock Nash, of South Norwalk, Connecticut, for an improvement in "Liquid Stuffing-Boxes for Steam-Turbines," errors appear in the printed specification requiring correction, as follows: In line 28, page 3, the word "rotating" before the word "fluid" should be stricken out and inserted before the word "part," same line, and in line 55, same page, the word "rotating" before the word "body" should be stricken out and inserted before the word "part," same line and same page; and that the said Letters Patent should be read with these corrections therein that the same may conform to the record of the case in the Patent Office.

Signed and sealed this 6th day of December, A. D., 1904.

[SEAL.]

F. I. ALLEN,
*Commissioner of Patents.* tained in rapid revolution, whereby the liquid is caused to rotate in said chamber to form a joint between the disk and the chamber.

2. A stuffing-box comprising an annular chamber containing a liquid and a disk, the periphery of which extends into said chamber, one of said parts being provided with projections and adapted to be maintained in rapid revolution, whereby the liquid is caused to rotate in said chamber to form a joint between the disk and the chamber.

3. A stuffing-box comprising an annular chamber containing a liquid and a disk, the periphery of which extends into said chamber, one of said parts being adapted to be maintained in rapid revolution, whereby the liquid is caused to rotate in said chamber to form a joint between the disk and the chamber, and a reservoir of liquid connected with said chamber.

4. The combination of a shaft having a projecting collar, with a closure surrounding said collar and means for causing a liquid to rotate in said closure and form a seal by its centrifugal force, between the shaft and the closure-walls, for the purpose specified.

5. A stuffing-box, comprising a fixed part and a part combined with a rotating fluid rotated by said rotating part intervening and forming a joint between said parts.

6. The combination in a liquid stuffing-box, of a shaft having a collar with a closure surrounding said collar and a pipe having an opening in said closure at the level of the surface of the liquid in said closure, and means for supplying the pipe with liquid for the purpose specified.

7. A shaft-packing comprising a casing provided with an annular chamber for receiving a liquid surrounding said shaft, a collar secured to said shaft and extending within said chamber whereby the liquid is caused to rotate in said chamber.

8. The combination in a liquid stuffing-box of a shaft having a collar and a case having an annular recess adapted to retain a liquid under rotation surrounding said collar, with means for causing the liquid to rotate.

9. In a liquid stuffing-box, the combination of the shaft and its collar, with a case-recess inclosing said collar adapted to contain a liquid under high rotation, and projections on said collar for causing said liquid to rotate.

10. A stuffing-box comprising a fixed part and a part combined with a rotating body of mercury rotated by said rotating part intervening and forming a joint between said parts.

In testimony that I claim the foregoing as my invention I have signed my name, in presence of two witnesses, this 9th day of March, 1904.

LEWIS HALLOCK NASH.

Witnesses:
CHAS. A. HAVILAND,
E. W. HAVILAND.

---

It is hereby certified that in Letters Patent No. 773,297, granted October 25, 1904, upon the application of Lewis Hallock Nash, of South Norwalk, Connecticut, for an improvement in "Liquid Stuffing-Boxes for Steam-Turbines," errors appear in the printed specification requiring correction, as follows: In line 28, page 3, the word "rotating" before the word "fluid" should be stricken out and inserted before the word "part," same line, and in line 55, same page, the word "rotating" before the word "body" should be stricken out and inserted before the word "part," same line and same page; and that the said Letters Patent should be read with these corrections therein that the same may conform to the record of the case in the Patent Office.

Signed and sealed this 6th day of December, A. D., 1904.

[SEAL.]

F. I. ALLEN,
*Commissioner of Patents.*

 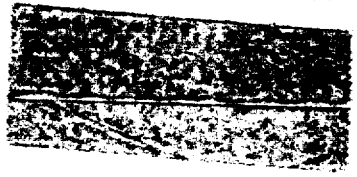

It is hereby certified that in Letters Patent No. 773,297, granted October 25, 1904, upon the application of Lewis Hallock Nash, of South Norwalk, Connecticut, for an improvement in "Liquid Stuffing-Boxes for Steam-Turbines," errors appear in the printed specification requiring correction, as follows: In line 28, page 3, the word "rotating" before the word "fluid" should be stricken out and inserted before the word "part," same line, and in line 55, same page, the word "rotating" before the word "body" should be stricken out and inserted before the word "part," same line and same page; and that the said Letters Patent should be read with these corrections therein that the same may conform to the record of the case in the Patent Office.

Signed and sealed this 6th day of December, A. D., 1904.

[SEAL.]

F. I. ALLEN,
*Commissioner of Patents.*